(12) United States Patent
Call et al.

(10) Patent No.: US 8,040,131 B2
(45) Date of Patent: Oct. 18, 2011

(54) METHOD FOR TESTING THE ACCEPTABILITY OF A MAGNETIC READ SENSOR

(75) Inventors: David Ernest Call, Folsom, CA (US); Ciaran Avram Fox, Sunnyvale, CA (US); Jih-Shiuan Luo, San Jose, CA (US); Robert Langland Smith, Sunnyvale, CA (US); Chin-Yu Yeh, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 566 days.

(21) Appl. No.: 12/166,078

(22) Filed: Jul. 1, 2008

(65) Prior Publication Data

US 2010/0002327 A1    Jan. 7, 2010

(51) Int. Cl.
*G01R 33/12* (2006.01)

(52) U.S. Cl. ...................................... 324/210

(58) Field of Classification Search ................. 324/210, 324/211, 212, 260, 261, 262, 537; 360/31
See application file for complete search history.

(56) References Cited

U.S. PATENT DOCUMENTS

| | | | |
|---|---|---|---|
| 6,486,660 B1 * | 11/2002 | Luse et al. .................... | 324/210 |
| 6,512,382 B1 | 1/2003 | Hsiao et al. .................... | 324/700 |
| 7,193,824 B2 | 3/2007 | Naka ......................... | 360/324.2 |
| 7,317,597 B2 | 1/2008 | Naka ......................... | 360/324.2 |
| 7,468,854 B2 * | 12/2008 | Yamashita et al. ............. | 360/75 |
| 2005/0116721 A1 | 6/2005 | Naka ............................ | 324/525 |
| 2007/0139053 A1 | 6/2007 | Naka ............................ | 324/525 |
| 2007/0273993 A1 | 11/2007 | Noda et al. ...................... | 360/31 |
| 2008/0049351 A1 | 2/2008 | Yamanaka et al. .............. | 360/59 |

\* cited by examiner

*Primary Examiner* — Kenneth J Whittington
(74) *Attorney, Agent, or Firm* — Zilka-Kotab, PC

(57) ABSTRACT

A method for testing a magnetic head to determine whether the magnetic head is unacceptably affected by temperature variations. The test includes testing the magnetic head at different temperatures and measuring either or both of a signal amplitude and a signal asymmetry of a signal from the magnetic head at the different temperatures. If signal amplitude or signal asymmetry vary excessively as a result of the temperature change then the head can be scrapped.

20 Claims, 4 Drawing Sheets

METHOD FOR TESTING THE ACCEPTABILITY OF A MAGNETIC READ SENSOR

FIELD OF THE INVENTION

The present invention relates to magnetic heads for data recording, and more particularly to a method for testing magnetic heads during manufacture.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides method for testing a magnetic head to determine whether the head is unacceptably affected by temperature variation. The test includes placing the head into a testing tool, and holding the head at a first temperature. While the head is at the first temperature, testing is performed to determine a first signal amplitude and/or first signal asymmetry. Then, the head is held at a second temperature, and a second test is performed to determine a second signal amplitude and/or second signal asymmetry. Based upon the results of the first and second tests, a determination can be made as to whether the head is acceptable or not.

The difference between the first and second signal amplitudes, can be used to determine an amplitude delta. Similarly, the difference between the first and second signal asymmetries can be used to determine an asymmetry delta. The determination as to whether the head is acceptable or not can be based upon whether either or both of the amplitude delta and asymmetry delta exceed a predetermined threshold.

The first and second temperatures can be selected to represent upper and lower ranges of expected operating temperatures. The first temperature can be a lower temperature and the second temperature can be a higher temperature. The higher temperature can be achieved by activating a heating element embedded within the head. Alternatively or additionally, an external heating source can be used to heat the sensor. The external heating source can be, for example, a hot plate provided within the tool or can be from heated air pumped into the tool.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
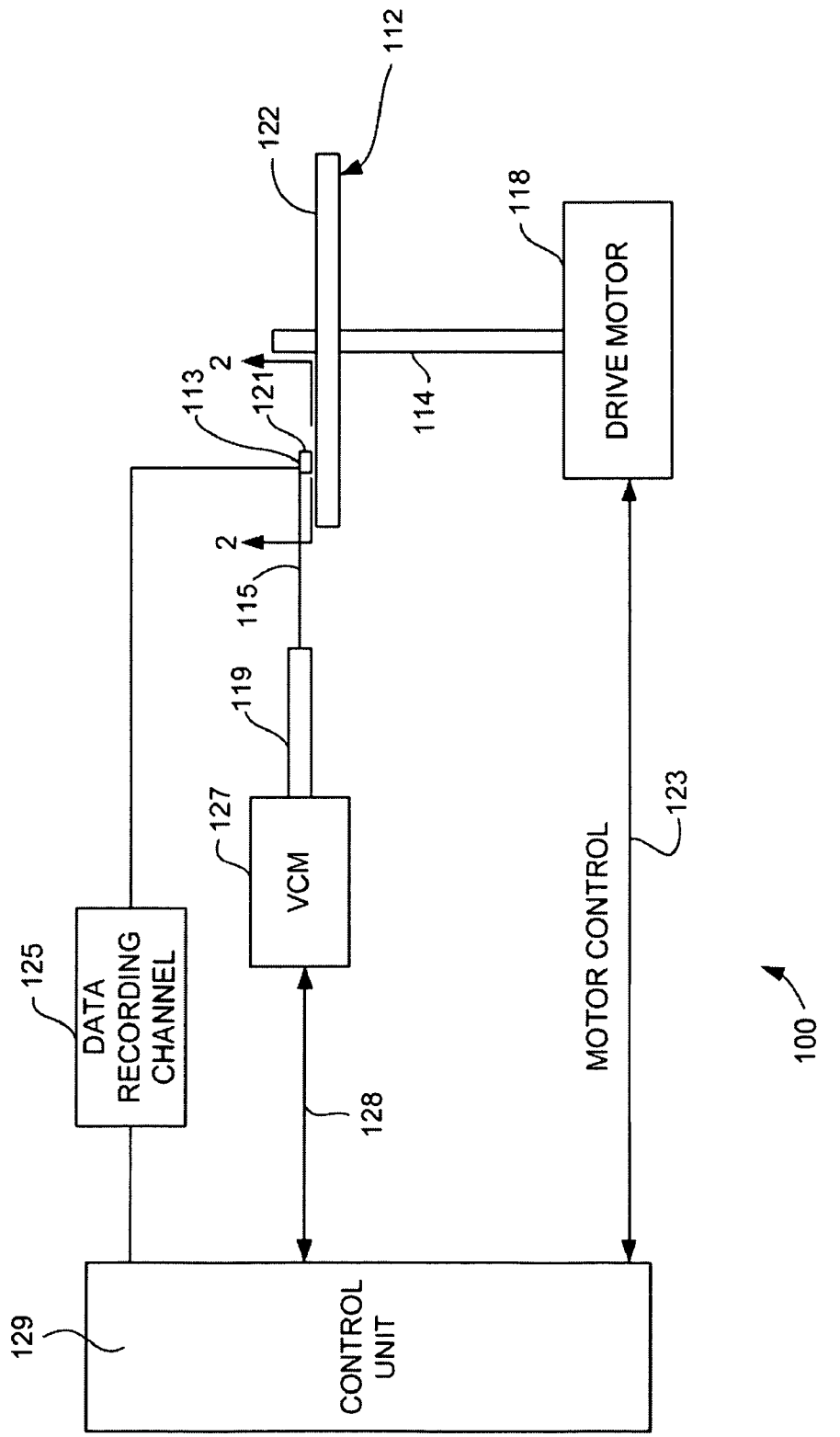
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing, between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals online 128 provide the desired current profiles to optimally move and position slider 113 to the desired data track on disk 112. Write and read signals are communicated to and from write and read heads 121 by way of recording channel 125.

Figure 2:
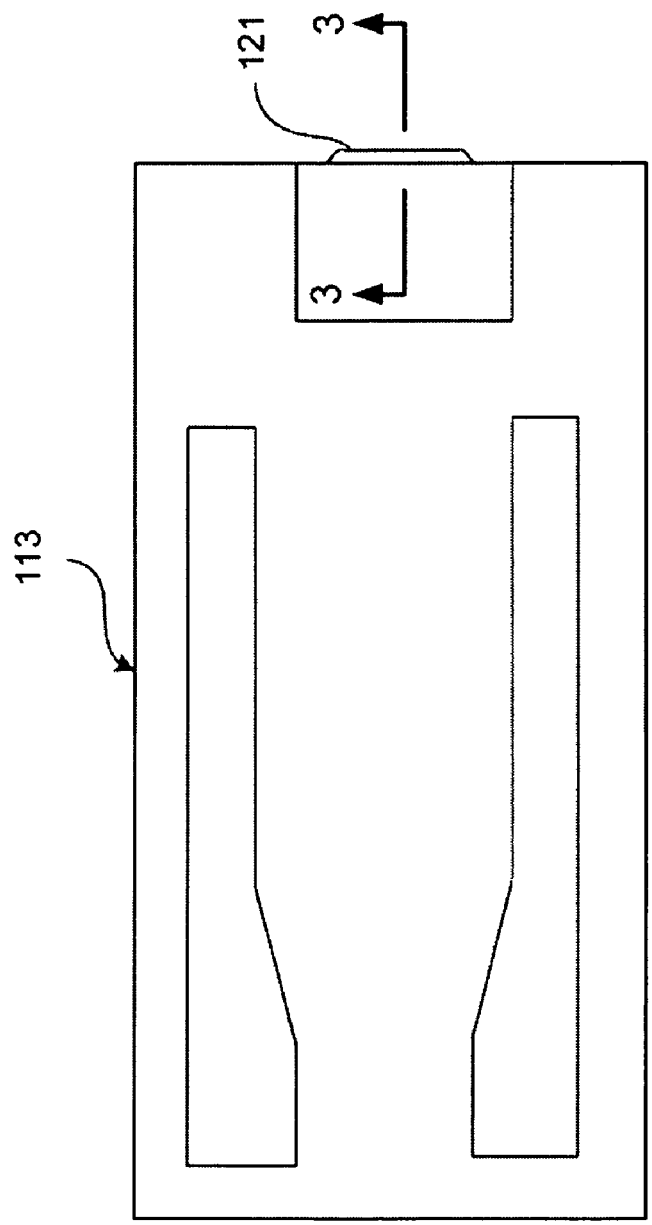
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
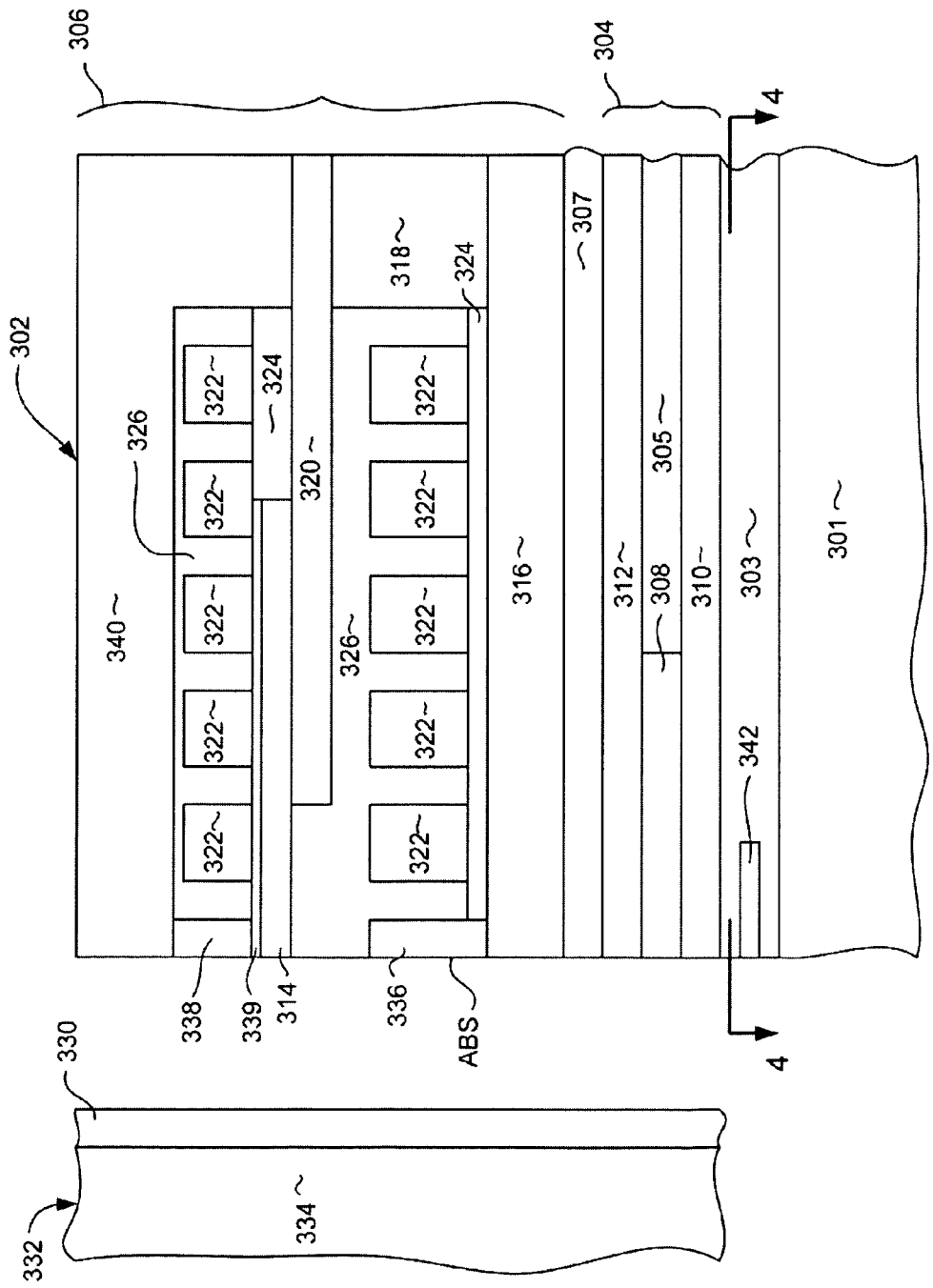
FIG. 3 is a cross sectional view of a magnetic head, taken from line 3-3 of FIG. 2 and rotated 90 degrees counterclockwise, of a magnetic read/write head according to an embodiment of the present invention.

With reference now to FIG. 3, the invention can be embodied in a magnetic head 302. The magnetic head 302 includes a read head 304 and a write head 306. The read head 304 includes a magnetoresistive sensor 308, which can be a giant magnetoresistive sensor (GMR), tunnel junction magnetoresistive sensor (TMR), or some other type of sensor. The magnetoresistive sensor 308 is located between first and second magnetic shields 310, 312. If the sensor 308 is a current perpendicular to plane sensor such as a current perpendicular to plane GMR sensor or a TMR sensor, the magnetic shields 310, 312 can be constructed of an electrically conductive material so that they may function as electrically conductive leads as well as magnetic shields. An insulation layer 307 can also be provided between the read head 304 and write head 306, and can be formed of a material such as alumina.

The write head 306 includes a magnetic write pole 314 and a magnetic return pole 316. The write pole 314 can be formed upon a magnetic shaping layer 320, and a magnetic back gap layer 318 magnetically connects the write pole 314 and shaping layer 320 with the return pole 316 in a region removed from the air bearing surface (ABS). A write coil 322 (shown in cross section in FIG. 3) passes between the write pole and shaping layer 314, 320 and the return pole 316, and may also pass above the write pole 314 and shaping layer 320. The write coil can be a helical coil or can be one or more pancake coils. The write coil 322 can be formed upon an insulation layer 324 and can be embedded in a coil insulation layer 326 such as alumina and or hard baked photoresist.

In operation, when an electrical current flows through the write coil 322. A resulting magnetic field causes a magnetic flux to flow through the return pole 316, back gap 318, shaping layer 320 and write pole 314. This causes a magnetic write field to be emitted from the tip of the write pole 314 toward a magnetic medium 332. The write pole 314 has a cross section at the ABS that is much smaller than the cross section of the return pole 316 at the ABS. Therefore, the magnetic field emitting from the write pole 314 is sufficiently dense and strong that it can write a data bit to a magnetically hard top layer 330 of the magnetic medium 332. The magnetic flux then flows through a magnetically softer under-layer 334, and returns back to the return pole 316, where it is sufficiently spread out and week that it does not erase the data bit recorded by the write head 314. A magnetic pedestal 336 can be provided at the ABS, and attached to the leading return pole 316 to act as a magnetic shield to prevent stray field from the write coil 322 from inadvertently reaching the magnetic media 332.

In order to increase write field gradient, and therefore, increase the speed with which the write head 306 can write data, a trailing, magnetic shield 338 can be provided. The trailing, magnetic shield 338 is separated from the write pole by a non-magnetic trailing gap 339, and may be connected with the shaping layer 320 and/or back gap 318 by a trailing return pole 340. The trailing shield 338 attracts the magnetic field from the write pole 314, which slightly cants the angle of the magnetic field emitting from the write pole 314. This canting of the write field increases the speed with which write field polarity can be switched by increasing the field gradient. The non-magnetic trailing gap layer 339 can be constructed of a material such as Rh, Ir or Ta.

As mentioned above, the magnetic head 302 should fly as close as close as possible to the magnetic media 330, without actually contacting the media 330 (i.e. "crashing"). The magnetic signal from the media 330 and magnetic write field from the write head 306 decrease exponentially with increasing distance between the media 330 and the head 302. Thermal fly height modulation can be used to control and minimize the spacing between the media 330 and the read and write heads 304, 306. To this end, a heater 342, such as a resistive heater, can be placed within the head 302. As shown in FIG. 3, the heater 342 can be located between the read head 304 and the substrate or slider body 301. However, the heater 342 could be located at some other location within the head 302. In order to decrease the spacing between the media 330 and the read and write heads 304, 306, the heater can heat the read and write heads 304, 306. This heating results in a thermal expansion of the read and write heads 304, 306, which causes the read and write heads 304, 306 to protrude at the ABS. If the read and write heads 304, 306 come too close to the media 330 (so that they risk contacting the media), the amount of thermal protrusion of the read and write heads 304, 306 can be reduced by reducing the heating provided by the heater element 342. The heater element 342 can be formed on or embedded in an insulation layer 303, which can be, for example, alumina.

The heater element 342, can be used to maintain a constant fly height by compensating for changes in ambient temperature. For example, at a cooler ambient temperatures, such as 0 degrees Celsius, the heater can be activated. At higher ambient temperatures, such as 65 degrees Celsius, the heater can either be deactivated or can be operated at a lower temperature.

While the use of a heater element 342 can improve fly height control, the performance of the read sensor 308 can be adversely affected by temperature variation. Even variations in ambient temperature can adversely affect the performance of the sensor. One way that temperature variation can adversely affect the performance of the sensor 308, is through mechanical stresses in the materials of the head 302 and magnetostriction induced magnetic domain movement in these materials.

For example, a temperature variation in the head 302 can cause a thermal expansion or contraction of the shields 310, 312, resulting in mechanical stresses and strains in these shields 310, 312. These mechanical stresses and strains in the shields 310, 312, when combined with magnetostriction inherent in the shields cause magnetic domain movement that can result in stray magnetic field that can affect the sensor 308. For example, a magnetic field from the shields 310, 312 can affect the biasing of the free layer (not shown) of the sensor 308. This can cause the amplitude of a signal from the sensor 308 to change with temperature or can cause an amplitude asymmetry that is temperature dependent. If these temperature dependent variations of amplitude and/or asymmetry are too large, then the head will not be suitable for use in a disk drive device.

The write head 302 can be designed so as to minimize, as minimize, as much as possible, such thermally induced amplitude variations or amplitude asymmetry. For example, the shields 310, 312 can be designed with materials and thicknesses that are chosen to minimize as much as possible, thermally induced domain migration. However, manufacturing tolerances, either wafer to wafer or within a wafer, can cause thermally induced amplitude and asymmetry variations to reach unacceptable levels.

The present invention, therefore, provides a method for determining whether a slider or group of sliders falls within prescribed manufacturing tolerances such that the read sensor is not excessively affected by temperature changes within the head 302.

As those skilled in the art will appreciate, a magnetic head 302 is formed on a wafer (not shown) with many thousands of heads being formed on a single wafer. The heads 302 are formed by various deposition, patterning and material removal processes. When the sliders have been formed on the wafer, the wafer is sliced into rows of sliders 113 (FIG. 1), with the wafer itself providing the body of the slider. The rows of sliders can be processed to form a desired air bearing surface (ABS), then the rows of sliders can be cut into individual sliders 113. The slider 113 can then be assembled onto a suspension assembly 115 as shown in FIG. 1.

The present invention provides a method for testing a sensor's response to thermal variations. This test can be performed at wafer level, at row level (after slicing the wafer into rows of sliders) at slider level (after a row of sliders has been cut into individual sliders) or after the slider had been assembled onto a head gimbal assembly or suspension 115 (FIG. 1).

To test a sensor's response to temperature variation, a slider 113 (row, wafer, individual slider, etc.) is placed into a testing tool, wherein a sense current can be applied to the sensor 308. A signal from the sensor is read while the sensor 308 is maintained a first temperature. The amplitude and/or asymmetry of the signal at the first temperature are recorded. Then, the temperature is changed by a desired amount and a signal is read from the sensor while the sensor is at the second temperature. Again, the signal amplitude and/or the signal asymmetry are measured at this second temperature. If the difference (ie. delta) of the amplitude and/or asymmetry of the signal response of the sensor at both temperatures is within a desired parameter range, then the sensor passes the test, and can be passed along for further manufacturing processing. If the amplitude and/or asymmetry delta of the signal are not within an acceptable parameter range, then the sensor does not pass and can be scrapped before further manufacturing time and expense is wasted on the slider.

The difference between the signal amplitude at the first temperature and signal amplitude at the second temperature can define an amplitude delta. A determination as to whether the sensor is acceptable or not can be based upon whether or not the amplitude delta exceeds a certain amplitude delta threshold. For example, the sensor can be considered unacceptable if the amplitude delta exceeds a threshold of about 10% to 20% of a lower nominal amplitude value.

Similarly, the difference between a signal asymmetry at the first temperature and a signal asymmetry at a lower temperature can define a signal asymmetry delta. The head can be considered unacceptable when the signal asymmetry delta exceeds a certain threshold, such as 10% to 20% of a lower nominal amplitude value.

In a possible embodiment of the invention first temperature can be a lower temperature and the second temperature can be a higher heated temperature. During the first test, the sensor can be held at a temperature of, for example, 0 degrees Celsius, or some temperature that represents an anticipated lower threshold operating temperature. The second test can be performed at an elevated temperature that can be chosen to represent an anticipated higher range operating temperature, such as, for example, about 65 degrees Celsius.

In order to raise the head 302 to the higher testing temperature, the head 302 can be heated by activating the heater element 342 (FIG. 3). Optionally, the write head 306 can be activated by passing a current through the write coil 322, while also activating the heater element 342 in order to further raise the temperature to a possible upper range operating temperature.

In another possible embodiment, rather than (or in addition to) activating the heater element 342, an external heat source can be used to heat the sensor. This external heat source can be, for example, a hot plate, heated air flow. Therefore, the head can be heated solely by the external heat source. Alternatively, however, both the external heat source and the embedded heater element 342 can be used together to heat the head. In addition, the external heat source, heater element 342 and write head 302 can all be activated together to heat the head 302.

The external heater provides a global, homogeneous heating (similar to that of a higher ambient temperature during operation). The internal embedded heater 342 provides a localized, inhomogeneous heating, which results different mechanical stresses on the elements in the head 302. By having both heaters working together, one call more accurately simulate the operation of a head in an actual working environment. Therefore, the external heater provides a means of controlling an ambient temperature during testing. This ambient temperature could vary from, for example, −10 degrees Celsius to +65 Celsius.

The test is preferably performed such that the difference between the first and second testing temperatures defines a desired temperature change or temperature delta. This temperature delta can be, for example 50 to 70 degrees Celsius, but could be larger or smaller depending on design requirements. By way of example, the first temperature could be somewhere in the range of −10 to +10 degrees Celsius, while the second test temperature could be somewhere in the range of 50 to 70 degrees Celsius.

Figure 4:
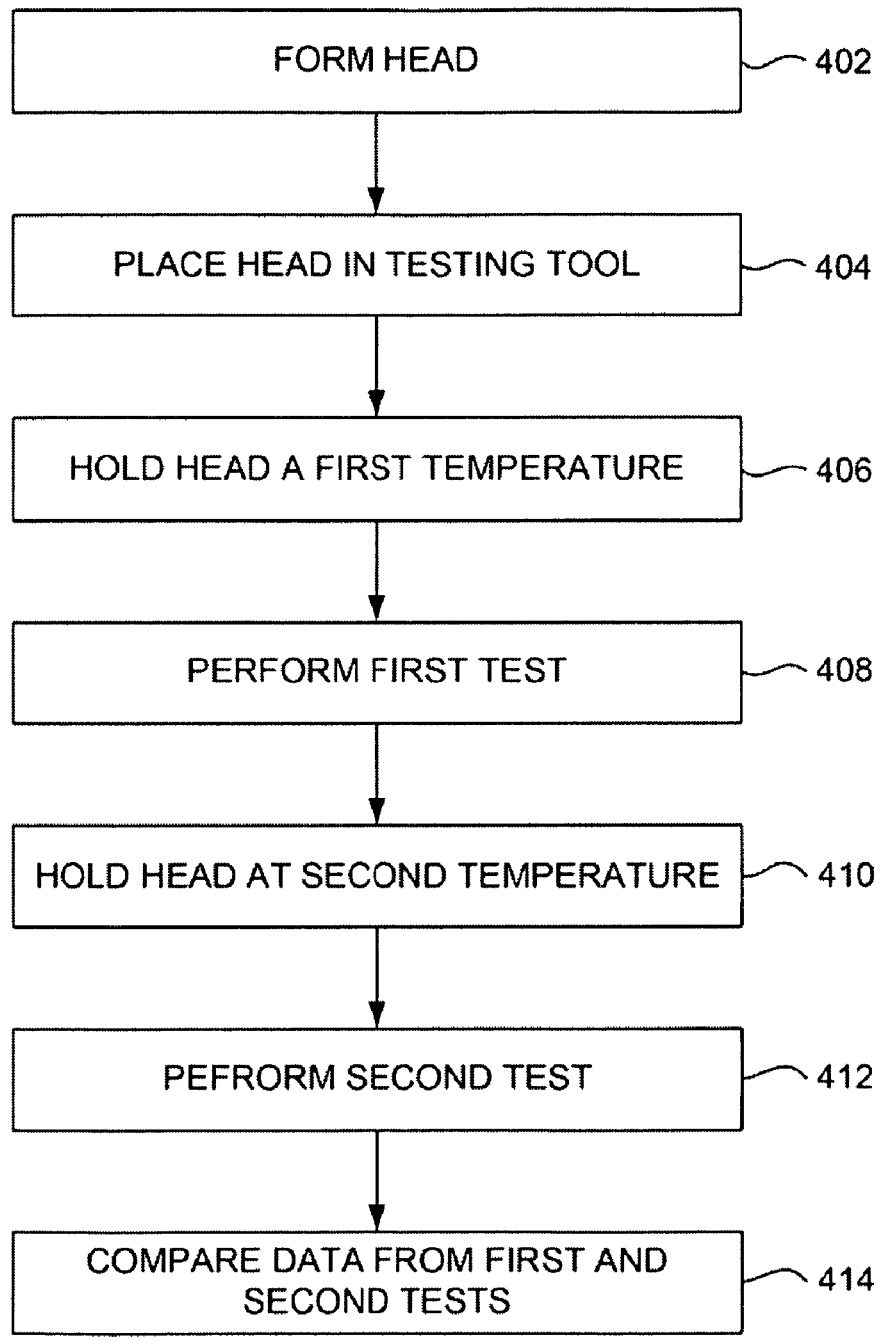
FIG. 4 is a flow chart summarizing a method for manufacturing a magnetic head according to an embodiment of the invention.

With reference now to FIG. 4, a method according to an embodiment of the present invention can be summarized as follows. In a step 402 a magnetic head is formed on a wafer. Then, in a step 404 the wafer is placed in a testing tool. In a step 404, the head is held at a first temperature. This first temperature can be a relatively low temperature, such as, for example −10 to +10 degrees Celsius. Then, in a step 406, a first test such as a magnetic quasi test is performed to determine sensor performance at this first temperature. Then, in a step 408, the head is held at a second temperature. This can include heating the head to a second temperature that is higher than the first temperature. This can be accomplished by activating a heating element embedded within the head. This could also be accomplished by applying heat from an external source such as a hot plate or forced heated air. The use of an external heat source can be in addition to or in lieu of the use of an internal, embedded heater. Then, in a step 410, while the head is at the second temperature, and in a step 412 a second test is performed to determine sensor performance at the second temperature. Then, in a step 414, data from the first and second tests is compared to determine whether the sensor performance is within design parameters. If there is too much variation between the results of the first and second test, the head can be scrapped. If the results of test 1 and test 2 are within tolerance, the head can be passed along for further processing.

While the above has discussed the measurement of signal amplitude and signal asymmetry and their associated deltas, the test can include the measurement of other signal parameters as well. For example testing can be performed to measure a signal to noise ratio at the first and second temperatures. If the signal to noise ratio varies too much (i.e. has too high of a signal to noise ratio delta) between the two temperatures, then the head can be considered failed. Similarly, the test can include a measurement of signal kink or of sensor resistance at zero field, and can include a measurement of delta of these signal parameters between the two temperatures.

Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for testing a magnetic head, comprising:
   forming a magnetic head;
   placing the magnetic head in a testing tool;
   holding the head at a first temperature;
   performing a first test on the head to determine a first signal amplitude of a signal from the head while the head is at the first temperature;
   holding the head at a second temperature;
   performing a second test on the head to determine a second signal amplitude of a signal from the head while the head is at the second temperature; and
   determining whether the head is acceptable based on the first and second signal amplitude; wherein
   a difference between the first and second signal amplitudes determines an amplitude delta, and wherein the determination of whether the head is acceptable further comprises determining whether the amplitude delta has exceeded a predetermined threshold.

2. A method as in claim 1, wherein the second temperature is higher than the first temperature and wherein the head is raised to the second temperature by supplying heated air into the tool.

3. A method as in claim 1 wherein a difference between the first and second signal amplitudes determines an amplitude delta, and wherein the determination of whether the head is acceptable further comprises determining whether the amplitude delta has exceeded about 10% of a lower nominal amplitude value.

4. A method as in claim 1, wherein the difference between the first and second temperatures defines a temperature delta, and wherein the temperature delta is 50 to 70 degrees Celsius.

5. A method as in claim 1, wherein the difference between the first and second temperatures defines a temperature delta, and wherein the temperature delta is about 60 degrees Celsius.

6. A method as in claim 1, wherein the first temperature is −10 to +10 degrees Celsius and the second temperature is 50 to 70 degrees Celsius.

7. A method as in claim 1, wherein the second temperature is higher than the first temperature and wherein the head is raised to the second temperature by activating a heater element that is embedded within the head.

8. A method as in claim 1, wherein the second temperature is higher than the first temperature and wherein the head is raised to the second temperature by activating a heating plate within the tool.

9. A method for testing a magnetic head, comprising:
   forming a magnetic head;
   placing the magnetic head in a testing tool;
   holding the head at a first temperature;
   performing a first test on the head to determine a first signal asymmetry of a signal from the head while the head is at the first temperature;
   holding the head at a second temperature;
   performing a second test on the head to determine a second signal asymmetry of a signal from the head while the head is at the second temperature; and determining whether the head is acceptable based on the first and second signal asymmetry.

10. A method as in claim 9, wherein the second temperature is higher than the first temperature and wherein the head is raised to the second temperature by supplying heated air into the tool.

11. A method as in claim 9 wherein a difference between the first and second signal asymmetries determines an asymmetry delta, and wherein the determination of whether the head is acceptable further comprises determining whether the asymmetry delta has exceeded a predetermined threshold.

12. A method as in claim 9 wherein a difference between the first and second signal asymmetry determines an amplitude delta, and wherein the determination of whether the head is acceptable further comprises determining whether the asymmetry delta has exceeded about 10%.

13. A method as in claim 9 wherein a difference between the first and second signal asymmetry determines an amplitude delta, and wherein the determination of whether the head is acceptable further comprises determining whether the asymmetry delta has exceeded about 20% of a lower nominal amplitude value.

14. A method as in claim 9, wherein the difference between the first and second temperatures defines a temperature delta, and wherein the temperature delta is 50 to 70 degrees Celsius.

15. A method as in claim 9, wherein the difference between the first and second temperatures defines a temperature delta, and wherein the temperature delta is about 60 degrees Celsius.

16. A method as in claim 9, wherein the first temperature is −10 to +10 degrees Celsius and the second temperature is 50 to 70 degrees Celsius.

17. A method as in claim 9, wherein the second temperature is higher than the first temperature and wherein the head is raised to the second temperature by activating a heater element that is embedded within the head.

18. A method as in claim 9, wherein the second temperature is higher than the first temperature and wherein the head is raised to the second temperature by activating a heating plate within the tool.

19. A method for testing a magnetic head, comprising:
forming a magnetic head;
placing the magnetic head in a testing tool;
holding the head at a first temperature;
performing a first test on the head to determine a first signal parameter measurement of a signal from the head while the head is at the first temperature;
holding the head at a second temperature;
performing a second test on the head to determine a second signal parameter measurement of a signal from the head while the head is at the second temperature; and
determining whether the head is acceptable based on the first and second signal parameters; wherein
a difference between the first and second signal parameter measurement determines a parameter delta and wherein the determination of whether the head is acceptable is based upon whether the parameter delta exceeds a predetermined threshold.

20. A method as in claim 19, wherein the first and second signal parameter measurements comprise: resistance at zero magnetic field; amplitude; asymmetry; signal to noise ratio; or signal kink.

* * * * *